United States Patent [19]

Smith

[11] Patent Number: 5,399,444
[45] Date of Patent: Mar. 21, 1995

[54] ENCAPSULATED DRY ELECTROLYTE COMPOSITION FOR TIME RELEASE INTO A SOLUTE

[75] Inventor: Andrew V. Smith, Newport, R.I.

[73] Assignee: The United States of America as represented by the Secretary of the Navy, Washington, D.C.

[21] Appl. No.: 129,728

[22] Filed: Sep. 30, 1993

[51] Int. Cl.⁶ .............................................. H01M 2/40
[52] U.S. Cl. ..................... 429/70; 429/118; 429/126; 429/189
[58] Field of Search .................. 429/51, 70, 126, 113, 429/118, 189; 204/233, 234

[56] References Cited

U.S. PATENT DOCUMENTS

| | | |
|---|---|---|
| 3,463,671 | 8/1969 | Doll et al. ............................. 429/51 |
| 3,671,318 | 6/1972 | Moe ................................. 429/118 X |
| 3,823,036 | 7/1974 | Bjorkman .............................. 429/70 |
| 4,005,246 | 1/1977 | Schiffer et al. .................. 429/118 X |
| 4,687,660 | 8/1987 | Baker et al. ........................ 424/465 |
| 4,788,111 | 11/1988 | Niksa et al. ....................... 429/51 X |

Primary Examiner—Stephen Kalafut
Attorney, Agent, or Firm—Michael J. McGowan; Prithvi C. Lall; Michael F. Oglo

[57] ABSTRACT

A device for delivering a water soluble electrolyte is provided comprising a core of a solid electrolyte composition enclosed by a polymeric coating which is permeable to water. The coating has at least one hole to permit passage of an aqueous solution of the electrolyte. The device is useful to maintain the concentration of an electrolyte composition in an electrochemical apparatus such as a fuel cell or a battery.

4 Claims, 1 Drawing Sheet

ENCAPSULATED DRY ELECTROLYTE COMPOSITION FOR TIME RELEASE INTO A SOLUTE

STATEMENT OF GOVERNMENT INTEREST

The invention described herein may be manufactured and used for the Government of the United States of America for governmental purposes without the payment of any royalties thereon or therefor.

BACKGROUND OF THE INVENTION

1. Field of the Invention

This invention relates to compositions for controlled dispensing of a dry electrolyte composition into a solution of the electrolyte composition. More particularly, this invention relates to a device for dispensing a dry electrolyte composition by osmotic pumping into an aqueous electrolyte solution for an electrochemical apparatus or process.

2. Description of the Prior Art

Prior to the present invention electrolytes for battery or fuel cell systems were delivered from dry electrolyte complexes stored in shaped solids including powder or pellets. Unfortunately, the present forms for delivering electrolyte render it difficult to control the dissolution rate of the dry electrolyte composition into the surrounding aqueous electrolyte composition during operation of the electrochemical apparatus or process. While some degree of electrolyte rate delivery can be attained by controlling the geometric size and shape of the electrolyte composition, the degree of control is too imprecise to properly control the aqueous electrolyte composition over the life of the solid electrolyte composition when its size and shape are constantly changing. One specific example of this problem is the dissolution rate sensitivity of shaped solids to the flow rate of the electrolyte. The release rate for an osmotic pump coated electrolyte will be independent of the flow rate of aqueous electrolyte around it.

Devices for delivering pharmaceutical compositions by diffusion through a permeable polymer coating for the pharmaceutical composition are well known in the art. Included in these delivery systems are those which function by means of osmotic pumping. In such a system, the pharmaceutical composition is enclosed by a continuous semi-permeable coating such as a capsule or a film having a halo of predetermined size therethrough. The device containing the pharmaceutical composition is placed in an appropriate aqueous composition in a place such as the stomach or cul-de-sac of the eye where it imbibes water through the semipermeable membrane. At least a portion of the pharmaceutical is dissolved which causes an increase in osmotic pressure which causes a solution of the pharmaceutical being continuously pumped from the enclosed capsule or the film through at least one hole in the capsule or the film. Similar devices are available as a means for delivering pesticides.

In these systems, the environment surrounding the delivery system is essentially free of the solute being delivered and, is in the case of a pharmaceutical or pesticide is consumed or removed from the immediate environment of the device. Thus, in such systems, the delivered composition is released into a theoretically infinite dilute environment. The release rate is almost always a constant and is dependent on temperature, pump pore size, and permeability of the pump coating. Only at startup and at the end of the device's useful life does the release rate deviate from a constant value.

Representative delivery systems are disclosed, for example, in U.S. Pat. Nos. 4,562,794; 4,670,250; 4,687,660 and 4,769,027.

Prior to the present invention, delivery systems based upon internal osmotic pressure within discrete small vessels have not been utilized to maintain the concentration of a composition in the environment outside a delivery system. Such a system would be useful, for example, for controlling the composition of electrolyte in an aqueous composition surrounding the delivery system also containing an electrolyte.

SUMMARY OF THE INVENTION

This invention is based upon the discovery that the concentration of an electrolyte in solution can be maintained even when the electrolyte is being consumed continuously or intermittently by utilizing an electrolyte delivery system based upon internal osmotic pressure. The electrolyte delivery system comprises a solid electrolyte enclosed within a film or capsule having holes.

When the device of the present invention is used, it comes into contact with an aqueous environment containing an electrolyte. Water is imbibed through the semi-permeable film coating, in the process leaching out any water-soluble particles that may be within the film coating. The imbibed water dissolves the water-soluble electrolyte which produces an osmotic pressure gradient thereby increasing the osmotic pressure inside the device, resulting in the saturated (or partially saturated) solution of the electrolyte being pumped out the micropassageways in the film coating of the device. The relative amount of electrolyte solution to solid electrolyte in the delivery is such as to maintain the concentration of electrolyte in solution relatively constant during use of the electrolyte solution in an electrochemical apparatus or process. Representative suitable electrochemical apparatus include batteries, fuel cells and electrode ionization processes wherein electrolyte is utilized in a cathode and anode compartment.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Suitable solid electrolytes useful in the device of this invention include salts such as sea salt, zinc chloride or ammonium chloride or bases such as lithium hydroxide, sodium hydroxide or potassium hydroxide or mixtures thereof either alone or admixed with a binding agent and/pr additives enhancing battery performance.

Suitable binding agents useful for forming a solid water soluble composition of the electrolyte include starch, polytetrafluoroethylene or mixtures thereof. It should be noted that crystalline solids such as sodium hydroxide or zinc chloride may need little or no binders.

The film for enclosing the electrolyte is semi-permeable to water. Representative suitable films are formed from polymeric composition cellulosics, such as cellulose acetate, cellulose esters or the like; polyolefins such as polyethylene, polypropylene, polytetrafluoroethylene or the like; silicone rubber; vinyl polymers such as polyvinyl chloride, vinyl chloride-vinyl-acetate copolymers; polystyrene; or the like.

The devices of this invention are formed by coating particles of the electrolytes having a diameter preferably between about 1 and 3 mm.

The device of this invention can be made by any available manufacturing process. In one embodiment, the solid electrolyte particles or prills containing the electrolyte are coated with a spray of liquid polymer. Alternatively, the particles or prills are coated by a film of a liquid polymer. The film thickness, generally is preferably between about 80 and 120 microns. Holes in the film are formed either by dissolving the water soluble portion of the film by immersion in aqueous electrolyte or alternatively holes can be formed in the film such as by drilling, or laser drilling.

The device of this invention is mixed with an aqueous electrolyte which is used in an electrochemical apparatus or process. The aqueous electrolyte is cycled to the electrochemical apparatus or process, partially consumed and returned to the original container including the aqueous electrolyte and the electrolyte delivery devices of this invention. The ratio of the devices of this invention to the original aqueous electrolyte is such as to maintain the concentration of electrolyte in solution substantially constant. That is, the electrolyte should be delivered to the solution at substantially the same rate at which it is consumed.

The following relationship relating concentration of electrolyte to weight ratio of the devices, and rate of delivery of electrolyte from the devices:

$$\frac{dN}{dt} = \frac{A\sigma\Delta\rho c}{1}$$

Wherein $\frac{dN}{dt}$

Figure 1:
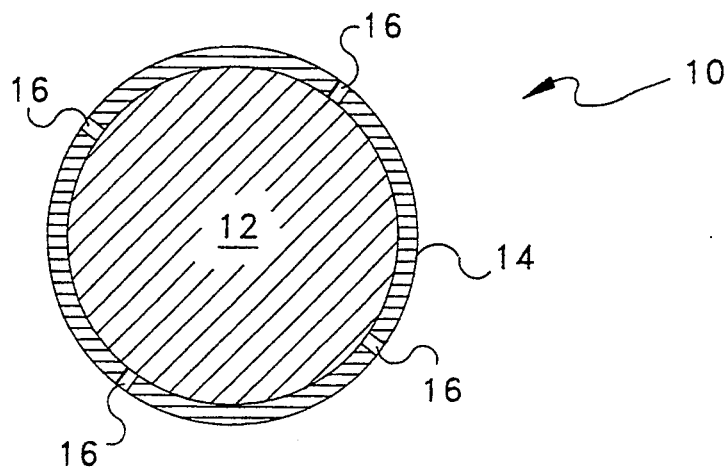
FIG. 1 is a schematic representation of an osmotic pump electrolytic pellet.

= electrolyte such as NaOH release rate
A = membrane area
$\sigma$ = membrane permeability
$\Delta\rho$ = osmotic pressure differential
1 = membrane thickness
c = electrolyte solubility Referring to FIG. 1, the osmotic pump 10 of this invention includes a solid electrolyte composition core 12 such as a solid sodium hydroxide composition and an enclosing film 14 formed from a membrane semipermeable to water such as cellulose acetate. The film 14 includes a plurality of delivery holes 16 through which water and aqueous sodium hydroxide can pass.

Figure 2:
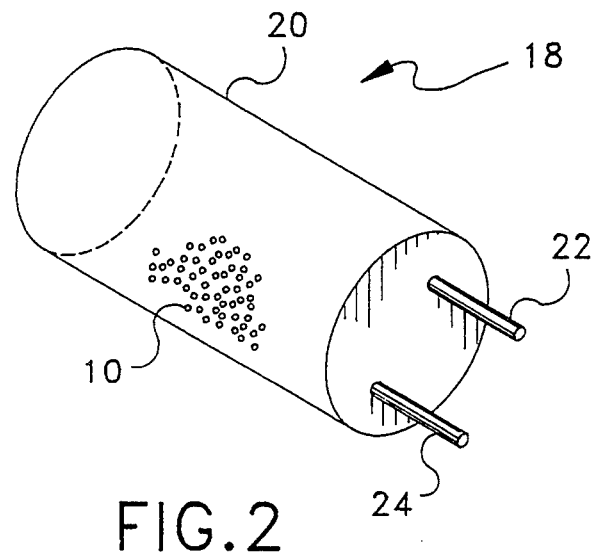
FIG. 2 is a schematic representation of a battery system according to the teachings of subject invention.

Referring to FIG. 2, a liquid electrolyte storage system 18 is shown for use in conjunction with a battery (not shown). The storage system 18 includes a container 20 containing a liquid electrolyte such as aqueous sodium hydroxide and a plurality of osmotic pump pellets 10 of FIG. 1. The container is provided with an outlet 22 to a battery (not shown). Spent electrolyte is supplied from the battery through the inlet 24 and enriched electrolyte is supplied to the batteries through the outlet 22.

Figure 3:
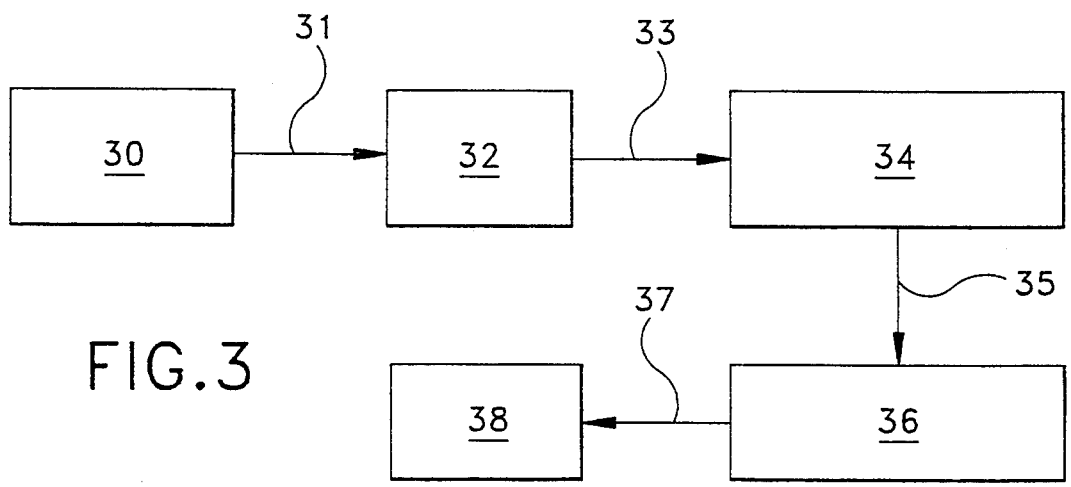
FIG. 3 is a block diagram of the manufacturing flow chart according to subject invention.

Referring to FIG. 3, a suitable process is illustrated for forming the osmotic pump pellets of this invention. Dry electrolyte is supplied from storage container 30 through conduit 31 to electrolyte melting furnace 32. Molten electrolyte is supplied from furnace 32 through conduit 33 to pellet caster 34 such as a chilled mold caster or an air cooled shot tower. The electrolyte pellets, thus formed are supplied to a coating system 36 such as a spray coating line through conduit 35 in order to coat the pellets with a film which is semi-permeable to water. The coated pellets then are directed to a laser drilling process 38 through conduit 37. In the laser drilling process 38, holes are drilled through the film as illustrated in FIG. 1.

In light of the above, it is therefore understood that within the scope of the appended claims, the invention may be practical otherwise than as specifically described.

What is claimed is:

1. An electrochemical system which comprises:
 a first housing;
 an electrolyte solution contained in said first housing;
 an anode placed in said electrolyte solution in said first housing;
 a cathode placed in said electrolyte solution in said first housing and located away from said anode; and
 at least one device being housed in a second housing for maintaining concentration of said electrolyte solution substantially constant, said at least one device being immersed in said solution and comprising a core comprising a solid electrolyte composition containing an electrolyte soluble in water, said core being enclosed by a polymeric coating which is permeable to water and said coating having at least one hole to permit passage of an aqueous solution of said electrolyte composition therethrough.

2. The system of claim 1 wherein said electrolyte composition contains a base.

3. The system of claim 1 wherein said electrolyte composition contains an acid.

4. The system of claim 1 wherein said electrolyte composition contains a salt.

* * * * *